(12) United States Patent
Li

(10) Patent No.: US 9,240,577 B2
(45) Date of Patent: Jan. 19, 2016

(54) CAP ASSEMBLY FOR LITHIUM ION SECONDARY BATTERY

(71) Applicant: OPTIMUM BATTERY CO., LTD, Shenzhen, Guangdong (CN)

(72) Inventor: Yao Li, Guangdong (CN)

(73) Assignee: OPTIMUM BATTERY CO., LTD, Shenzhen (CN)

( * ) Notice: Subject to any disclaimer, the term of this patent is extended or adjusted under 35 U.S.C. 154(b) by 140 days.

(21) Appl. No.: 13/929,837

(22) Filed: Jun. 28, 2013

(65) Prior Publication Data

US 2014/0011077 A1  Jan. 9, 2014

(30) Foreign Application Priority Data

Jul. 2, 2012  (CN) ............ 2012 1 0225252
Sep. 12, 2012  (CN) ............ 2012 1 0336430

(51) Int. Cl.
  *H01M 2/12*  (2006.01)
  *H01M 2/04*  (2006.01)
(52) U.S. Cl.
  CPC ............ *H01M 2/046* (2013.01); *H01M 2/1229* (2013.01); *H01M 2/1247* (2013.01); *H01M 2/1288* (2013.01)

(58) Field of Classification Search
  CPC .................................................. H01M 2/1241
  See application file for complete search history.

(56) References Cited

U.S. PATENT DOCUMENTS

| | | | | |
|---|---|---|---|---|
| 2003/0049521 | A1* | 3/2003 | Iwase et al. | 429/82 |
| 2003/0049527 | A1* | 3/2003 | Yageta et al. | 429/179 |
| 2003/0194601 | A1* | 10/2003 | Lei | 429/61 |
| 2007/0026302 | A1* | 2/2007 | Yoon | 429/129 |

* cited by examiner

*Primary Examiner* — Patrick Ryan
*Assistant Examiner* — Wyatt McConnell

(57) ABSTRACT

A cap assembly (100, 200) for a lithium ion secondary battery (1000, 2000). The cap assembly includes a cap plate (30, 97), a leakproof film (20, 98), and a cap cover (10, 99). The cap plate (30, 97) includes a supporting portion (31, 971) and a safety film (32, 972). The safety film is positioned in the supporting portion (31, 971). The safety film (32, 972) defines safety grooves (33, 973). The safety film (32, 972) is capable of break down along the safety grooves (33, 973). The leakproof film (20, 98) is attached on the supporting portion (31, 971). The leakproof film (20, 98) is made of a material with high temperature resistance and elasticity properties. The cap cover (10, 99) is attached on the leakproof film (20, 98).

10 Claims, 8 Drawing Sheets

CAP ASSEMBLY FOR LITHIUM ION SECONDARY BATTERY

CROSS-REFERENCE TO RELATED APPLICATIONS

This present application claims the benefit of Chinese Patent Application No. 201210225252.5 filed on Jul. 2, 2012 and 201210336430.1 filed on Sep. 12, 2012; the contents of which are hereby incorporated by reference.

BACKGROUND OF THE INVENTION

1. Field of the Invention

This present application relates to lithium ion secondary batteries, and more particular, to a cap assembly for a lithium ion secondary battery.

2. Description of the Related Art

Lithium ion secondary batteries are widely used for high energy-density and rechargeable characters.

A typical lithium ion secondary battery includes a cap assembly 38 to be assembled to and enclose an upper end of a can 36. The cap assembly 38 includes a gasket 40, a cap cover 42, and a cap plate 52. The can 36 receives an electrode assembly and electrolyte. The gasket 40 receives the cap cover 42 and the cap plate 52. The cap cover 42 defines a number of through holes. The cap plate 52 is provided with a ring-shaped safety groove 54. When the internal pressure of the can 36 rises, the cap plate 52 will break along the safety groove 54 to evacuate gas to the exterior of the can 36 via the through hole of the cap cover 42. However, the electrolyte will also leak to the exterior via the through hole of the cap cover 42, which may result in burning and degradation of safety performance of the lithium secondary battery.

Therefore, it is desirable to provide a cap assembly for lithium ion secondary battery, which can overcome the problems and limitations as mentioned above.

SUMMARY OF THE INVENTION

The present invention is directed to an improved cap assembly for lithium ion secondary battery that substantially obviates one or more of the problems due to limitations and disadvantages of the related art.

In an aspect of the present invention, there is provided a cap assembly (100, 200) for a lithium ion secondary battery (1000, 2000). The cap assembly includes a cap plate (30, 97), a leakproof film (20, 98), and a cap cover (10, 99). The cap plate (30, 97) includes a supporting portion (31, 971) and a safety film (32, 972). The safety film is positioned in the supporting portion (31, 971). The safety film (32, 972) defines safety grooves (33, 973). The safety film (32, 972) is capable of break down along the safety grooves (33, 973). The leakproof film (20, 98) is attached on the supporting portion (31, 971). The leakproof film (20, 98) is made of a material with high temperature resistance and elasticity properties. The cap cover (10, 99) is attached on the leakproof film (20, 98).

It is to be understood that both the foregoing general description and the following detailed description are exemplary and explanatory and are intended to provide further explanations of the invention as claimed.

BRIEF DESCRIPTION OF THE DRAWINGS

Many aspects of the present disclosure can be better understood with reference to the following drawings. The components in the drawings are not necessary drawn to scale, the emphasis instead being placing upon clearly illustrating the principles of the present disclosure. Moreover, in the drawings, like reference numerals designate corresponding parts throughout views.

DETAILED DESCRIPTION OF THE PREFERRED EMBODIMENTS

Embodiments of present disclosure will now be described in detail below and with reference to the drawings.

Figure 1:
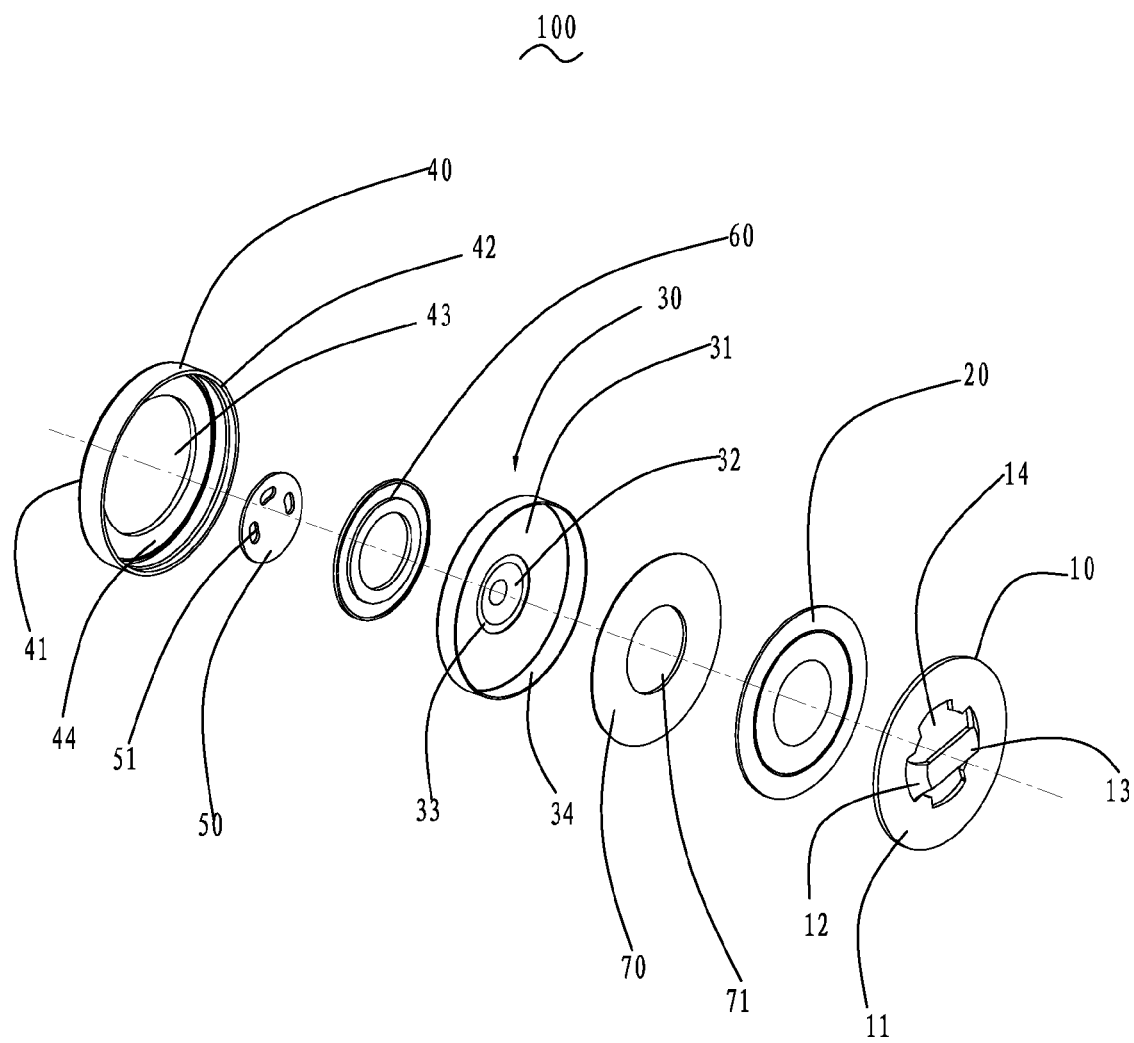
FIG. 1 is an exploded, isometric view of a cap assembly for a lithium ion secondary battery, in accordance with a first embodiment of the present invention.
Figure 2:
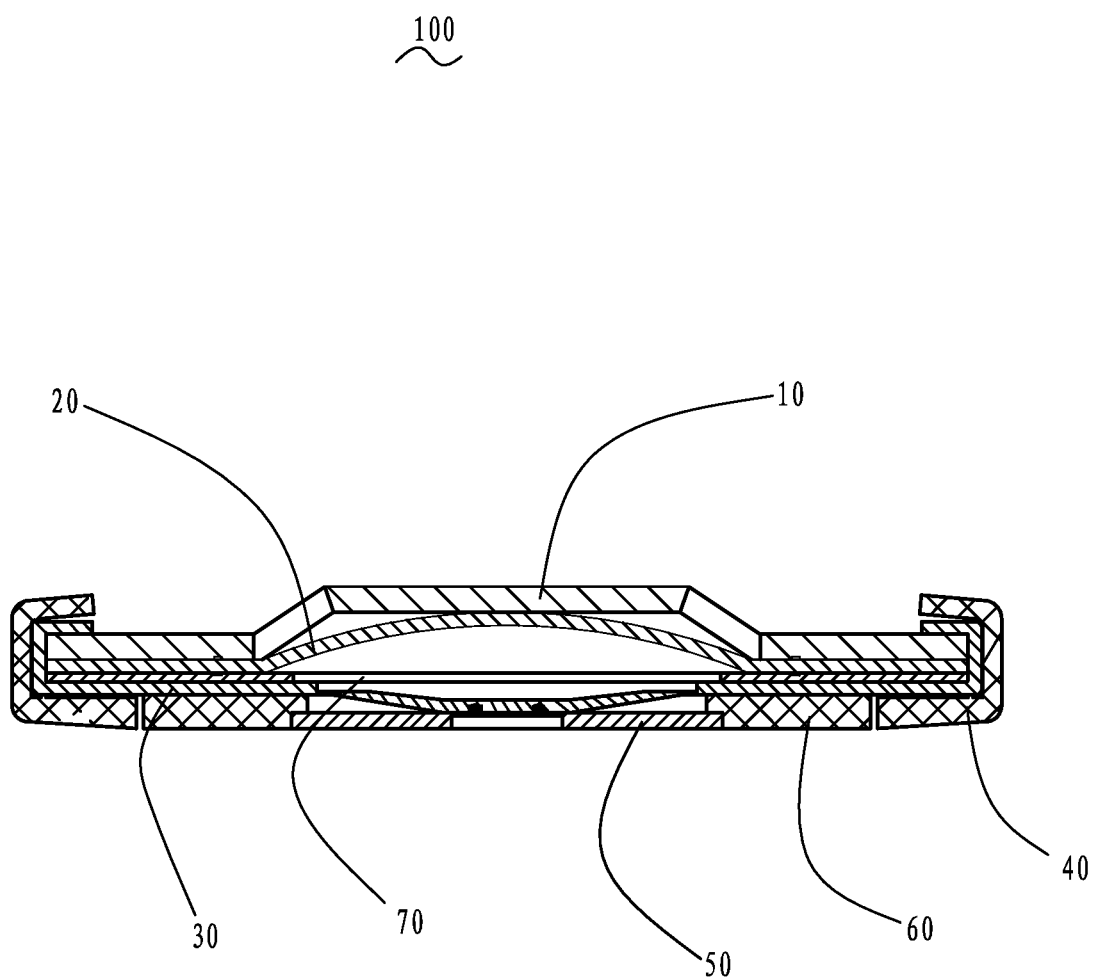
FIG. 2 is a cross-sectional view of the cap assembly of FIG. 1, where the cap assembly is assembled.
Figure 3:
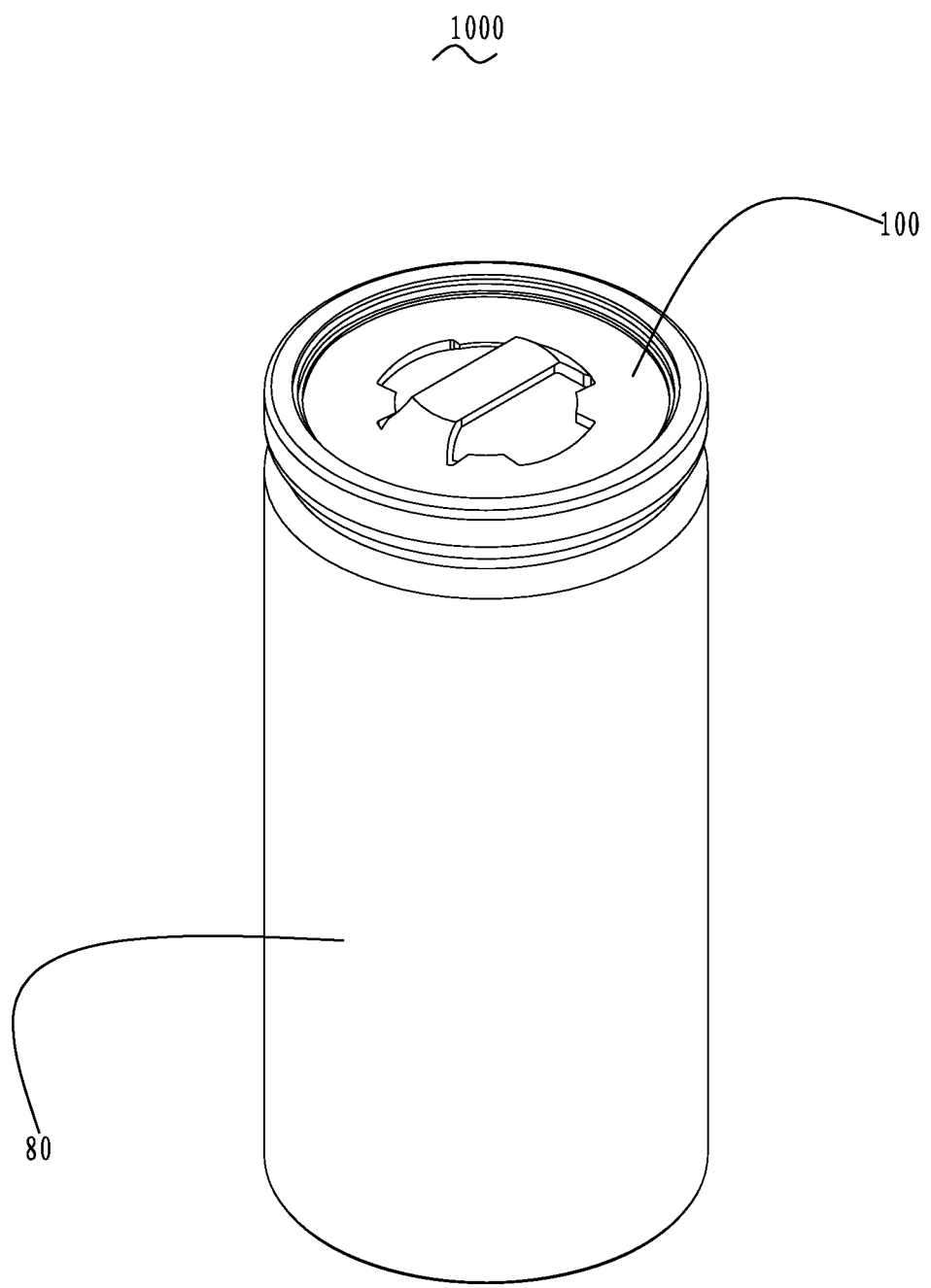
FIG. 3 is an isometric, schematic view of the lithium ion secondary battery, in accordance with the first embodiment.

FIG. 1 to FIG. 3 show a lithium ion secondary battery 1000, according to a first embodiment of the present invention. The lithium ion secondary battery 1000 includes a cap assembly 100 and a can 80. The can 80 is substantially cylindrical and made of metal. The can 80 is hollow and a lower end of the can 80 is enclosed and an upper end of the can 80 defines an opening. The can 80 is configured for containing a rolled electrode assembly and electrolyte. The cap assembly 100 is mounted to the upper end of the can 80 to enclose the opening of the can 80.

The cap assembly 100 includes a cap cover 10, a leakproof film 20, a cap plate 30, and an outer gasket 40.

The cap cover 10 is made of metal such as copper or aluminum by a stamping process. The cap cover 10 is substantially circular and includes a base portion 11, two inclination portions 12, and a top portion 13. The base portion 11 is an annular plate. Each inclination portion 12 is in a strip shape and extends from an inner periphery of the base portion 11. Each inclination portion 12 is slant to the base portion 11 and extends toward the other inclination portion 12. The top portion 13 is also in a strip shape and is connected between the inclination portions 12. The top portion 13 is parallel to the base portion 11. The cap cover 10 defines two cover through holes 14 symmetrically distributed at two sides of the top portion 13. An outer periphery of the base portion 11 is rough and includes a plurality of burrs.

The leakproof film 20 is circular. A diameter of the leakproof film 20 substantially corresponds to an outer diameter of the base portion 11 of the cap cover 10. The leakproof film 20 is made of rubber with high temperature resistance, elasticity, and anti-aging properties.

The cap plate 30 is made from an aluminum sheet by stamping. The cap plate 30 includes a supporting portion 31 and a safety film 32. The supporting portion 31 is substantially annular in shape, which is similar to the shape of the base portion 11. The safety film 32 is circular and positioned in the center of the supporting portion 31. In the embodiment, the supporting portion 31 and the safety film 32 are integrally formed. The security film 31 defines two circular safety grooves 33. The safety grooves 33 are coaxial with each other and an outer safety groove 33 is formed between the supporting portion 31 and the safety film 32. The cap plate 30 also includes a cylindrical side wall 34 extends from an outer periphery of the supporting portion 31. The safety film 32 is substantially dome-shaped and convex to a direction opposite to a direction that the side wall 34 extending.

The outer gasket 40 is made of poly ethylene-propylene with high temperature resistance and insulative properties. The poly ethylene-propylene is one kind of material that well known in the art. The outer gasket 40 is generally a hollow cylinder and includes a circular enclosure end 41 and a circular mounting end 42 opposite to the enclosure end 41. A diameter of the enclosure end 41 is greater than a diameter of the mounting end 42. The outer gasket 40 defines a stepped through hole 43 passing through the enclosure end 41 and the mounting end 42. A diameter of the stepped through hole 43 adjacent to the enclosure end 41 corresponds to an outer diameter of the base portion 11. The outer gasket 40 also includes an annular lug 44 extending radically inwardly from the enclosure end 41.

The cap assembly 100 also includes a holding plate 50 and an inner gasket 60. The holding plate 50 is circular and defines three air passing holes 51. The inner gasket 60 is made of polytetrafluoroethylene. The polytetrafluoroethylene is one kind of material that well known in the art and with high temperature resistance property and does not deform under a high temperature at about 350 centigrade degrees.

The cap assembly 100 also includes an enhancing plate 70. The enhancing plate 70 is annular and defines a passage hole 71. An outer diameter of the enhancing plate 70 corresponds to an outer diameter of the cap plate 30. A diameter of the passage hole 71 corresponds to a diameter of the safety film 32.

When assembling the lithium ion secondary battery 1000, the enhancing plate 70 is received in the side wall 34 and attached to the supporting portion 31 to enhance to the supporting portion 31. The enhance plate 70 presses on the supporting portion 31 and surrounds the safety film 32. The leakproof film 20 is received in the side wall 34 and is attached on the enhancing plate 70, namely the enhancing plate 70 is clamped between cap plate 30 and the leakproof film 20. The cap cover 10 is received in the side wall 34 with the burrs of the cap cover 10 compactly contacting an inner surface of the side wall 34. A height of the burrs is about 0.1 millimeter. As the burrs can make the cap 10 more compactly contact with the side wall 33, it prevents the cap cover 10, the security film 20, and the enhancing plate 70 from falling off from the cap plate 30. Then a periphery of the side wall 34 is welded to a surface of the base portion 11 opposite to the safety film 20 by an ultrasonic welding process. The ultrasonic welding process is well known in the art. The cap plate 30 is received in the outer gasket 40 with the supporting portion 31 being attached on the annular lug 44 of the outer gasket 40. The holding plate 50 is assembled to the rolled electrode assembly. The inner gasket 60 is received in the annular lug 44 of the outer gasket 40 and is mounted on the holding plate 50. The inner gasket 60 presses on the holding plate 50. The outer gasket 40 is received in the opening of the can 80. The inner gasket 60 is positioned between the holding plate 50 and the cap plate 30 to isolate the holding plate 50 and the cap plate 30. The cap plate 30 encloses the can 80. Electrode tabs of the rolled electrode assembly pass through the air passing holes 51 and are welded to a vertex of the safety film 31.

Figure 4:
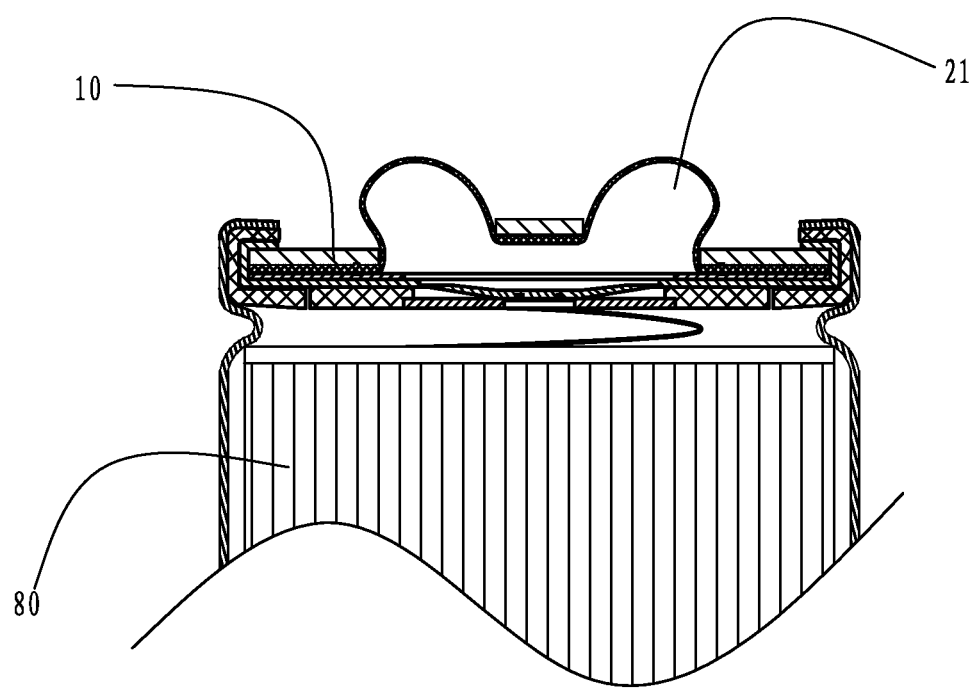
FIG. 4 is a part sectional view of the lithium ion secondary battery of FIG. 3, when the internal pressure of the lithium secondary battery rises.

Referring to FIG. 1 and FIG. 4, in use, when an accident such as a short circuit or a collision occurs to the lithium ion secondary battery 1000, it results in the temperature of the electrolyte rapidly rising to about 100 to 200 centigrade degrees, the electrolyte is evaporated, and the internal pressure of the lithium ion secondary battery 1000 rising to a certain limitation. Because the safety film 32 made of aluminum is very soft, the safety film 32 will break down along the safety grooves 33. Therefore, an electrical circuitry formed by the lithium ion secondary battery 1000 is cut off. Because the leakproof film 20 is made of rubber with high temperature resistance, anti-aging, and elasticity properties. The leakproof film 20 won't break. The leakproof film 20 deforms to form two balloon portions 21 protruding out the cap cover 10 from the cover through holes 14 for receiving evaporated electrolyte. Therefore, it can prevent the electrolyte leak out from the can 80. When the temperature of the electrolyte drops, the leakproof film recovers to an initial state, and the evaporated electrolyte is liquefied and drops into the can 80 again.

In alternative embodiments, the leakproof film 20 is not limited to rubber but can be other material with high temperature resistance, elasticity, and anti-aging properties.

Figure 5:
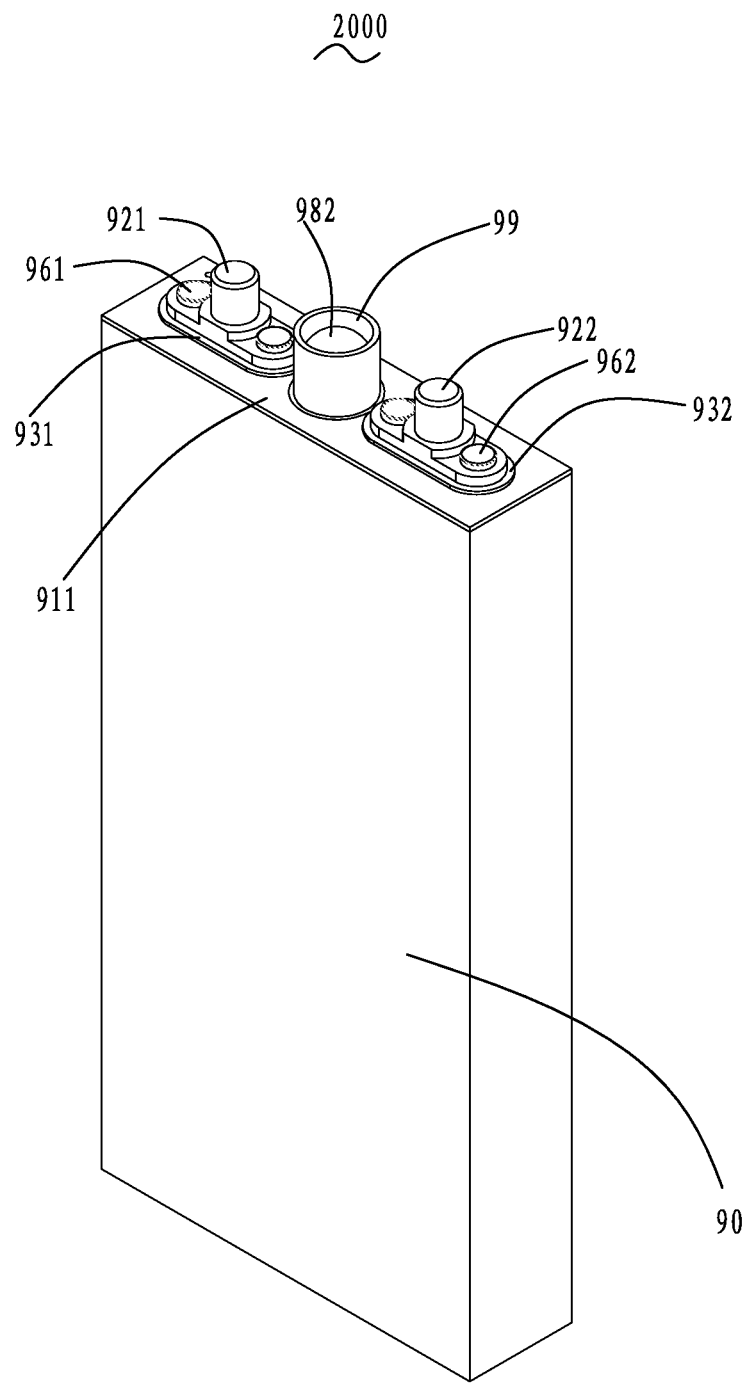
FIG. 5 is an isometric of a lithium ion secondary battery, according to a second embodiment of the present invention.
Figure 6:
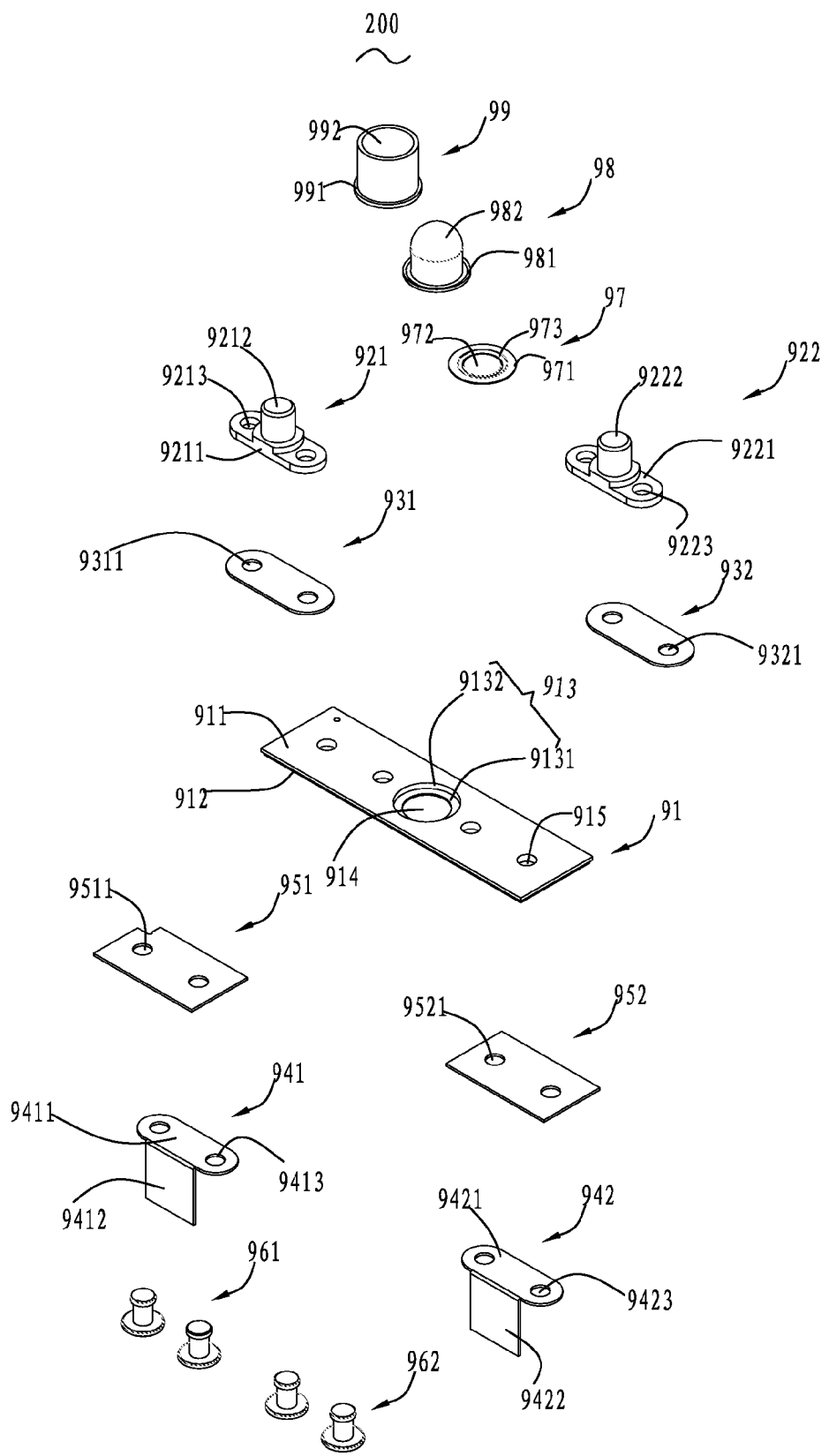
FIG. 6 is an exploded, isometric view of a cap assembly of the lithium ion secondary battery of FIG. 5.

FIG. 5 and FIG. 6 show a lithium ion secondary battery 2000, according to a second embodiment. The lithium ion secondary battery 2000 includes a cap assembly 200 and a can 90. The can 90 is substantially cuboid and made of metal. The can 90 is hollow and a lower end of the can 90 is enclosed and an upper end of the can 90 defines an opening. The can 90 is configured for containing a rolled electrode assembly and electrolyte. The cap assembly 200 is mounted to the upper end of the can 90 to enclose the opening of the can 90.

The cap assembly 200 includes a base plate 91, a positive terminal 921, a negative terminal 922, a first upper pad 931, a second upper pad 932, a positive conduction plate 941, a negative conduction plate 942, a first lower pad 951, a second lower 952, two first fasteners 961, two second fasteners 971, a cap plate 97, a leak proof film 98, and a cap cover 99.

The base plate 91 is rectangular and includes an upper surface 911 and a lower surface 912 opposite to the upper surface 911. The base plate 91 defines a mounting hole 913 in the middle, a center hole 914, and four first passing holes 915. The mounting hole 913 is a circular blind hole. The mounting hole 913 includes a bottom surface 9131 and a cylindrical interior surface 9132. The center hole 914 is a through hole and defined on the bottom surface 913 and is coaxial with the mounting hole 913. A diameter of the center hole 914 is less than a diameter of the mounting hole 913. Every two first passing holes 915 are located at one side of the mounting hole 13 and passing through the upper surface 911 and the lower surface 912.

The positive terminal 921 and the negative terminal 922 are made of conductive material and are identical. The positive terminal 921 includes a positive main portion 9211 and a positive protrusion 9212. The positive main portion 9211 is generally strip-shaped and defines two second passing holes 9213. The positive protrusion 9212 is cylindrical and perpendicularly extends from a middle of a surface of the positive main portion 9211. The two second passing holes 9213 are at two sides of the positive protrusion 9212. The negative terminal 922 includes a negative main portion 9221 and a negative protrusion 9222. The negative main portion 9221 is generally strip-shaped and defines two third passing holes 9223. The negative protrusion 9222 is cylindrical and perpendicularly extends from a middle of a surface of the negative main portion 9221. The two third passing holes 9223 are at two sides of the negative protrusion 9222.

The first upper pad 931 and the second upper pad 932 are made of insulative material and are identical. In the embodiment, the first upper pad 931 and the second upper pad 932 are made of polytetrafluoroethylene (PTEF) with high temperature resistance property. The polytetrafluoroethylene is one kind of material that well known in the art. The first upper pad 931 defines two fourth passing holes 9311. The second upper pad 932 defines two fifth passing holes 9321.

The positive conduction plate 941 and the negative conduction plate 942 are made of conductive material and are identical. The positive conduction plate 941 includes a positive planar portion 9411 and a positive bending portion 9412. The positive planar portion 9411 is generally strip-shaped and defines two sixth passing holes 9413. The positive bending portion 9412 is a rectangular plate and perpendicularly extends from a lengthwise side of the positive planar portion 9411. The negative conduction plate 942 includes a negative planar portion 9421 and a negative bending portion 9422. The negative plate portion 9421 is generally strip-shaped and defines two seven passing holes 9423. The negative bending portion 9422 is a rectangular plate and perpendicularly extends from a lengthwise side of the negative planar portion 9421.

The first lower pad 951 and the second lower pad 952 are made of insulative material and are identical. In the embodiment, the first upper pad 951 and the second upper pad 952 are made of polytetrafluoroethylene (PTEF) with high temperature resistance property. The first lower pad 951 is a rectangular plate and defines two eighth passing holes 9511. The second lower pad 952 is also a rectangular plate defines two ninth passing holes 9521.

Figure 7:
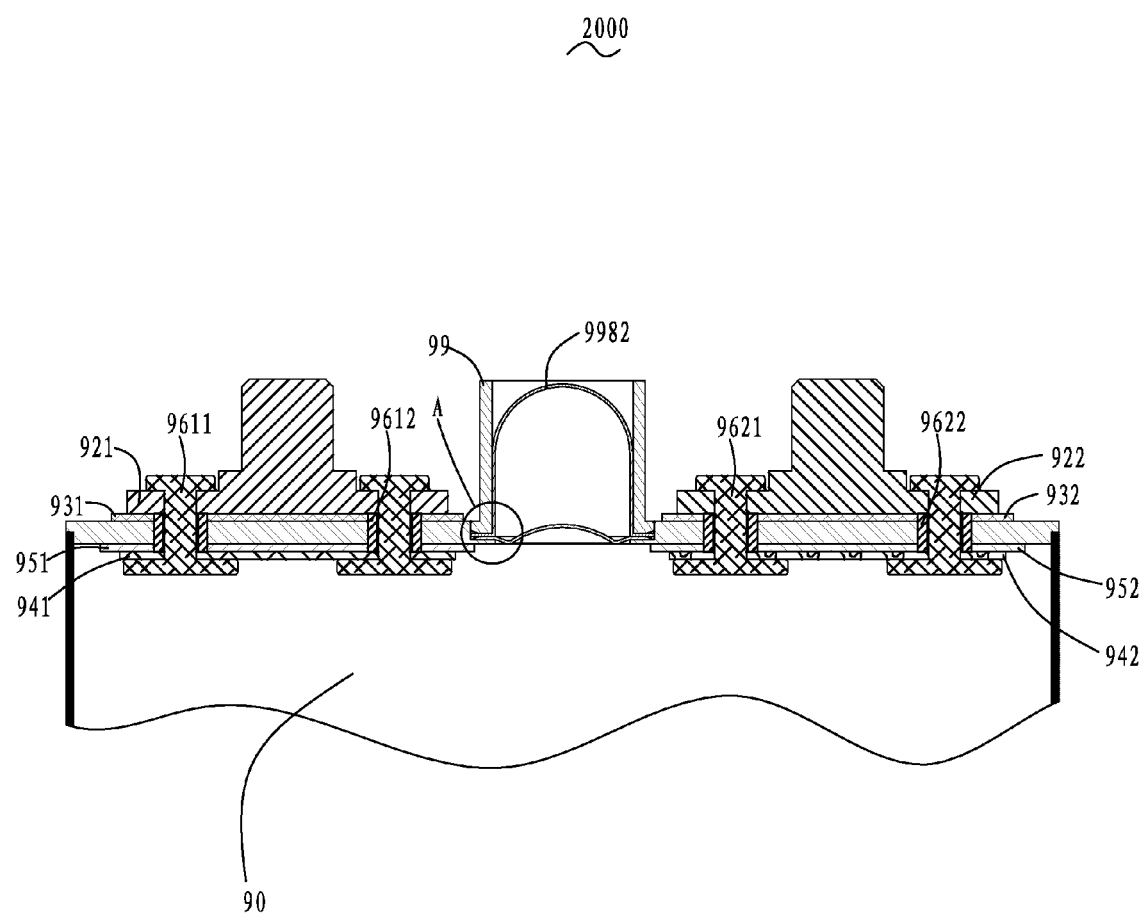
FIG. 7 is a part sectional view of the lithium ion secondary battery of FIG. 5.
Figure 8:
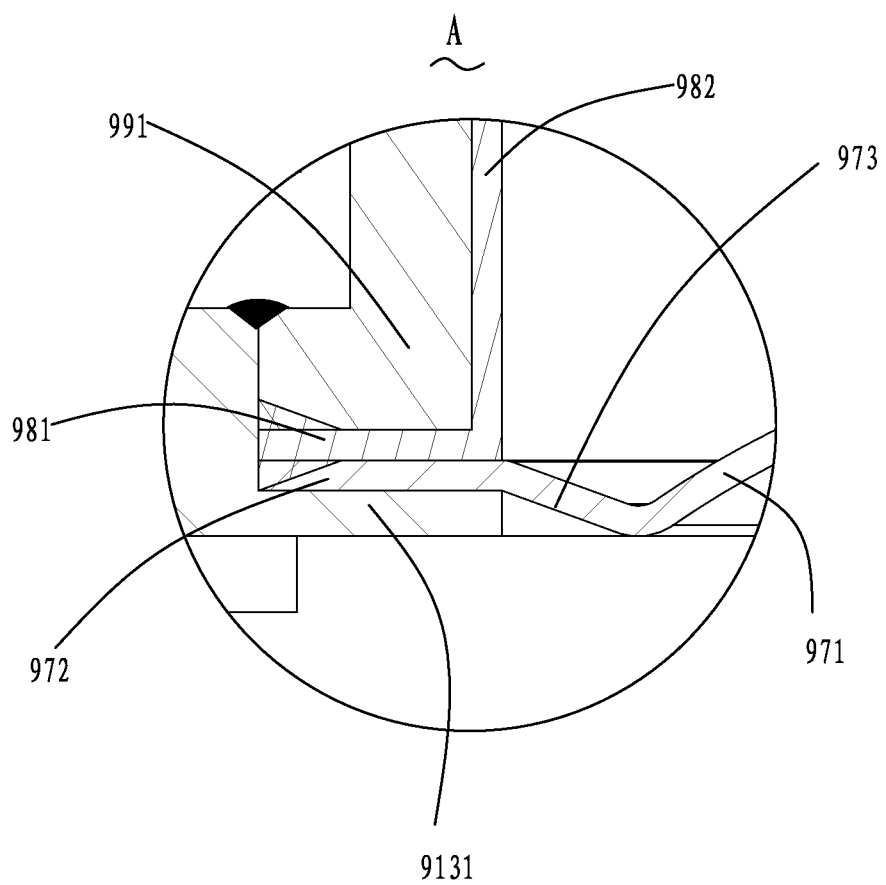
FIG. 8 is an enlarged view of a circled portion A of FIG. 7.

Also referring to FIG. 7 and FIG. 8, each first fastener 961 includes a first screw 9611 made of conductive material and a first ring 9612 made of insulative material. The first ring 9612 is configured for sleeving over the first screw 9611. Each second fastener 962 includes a second screw 9621 made of conductive material and a second ring 9622 made of insulative material. The second ring 9622 is configured for sleeving over the second screw 9621.

The cap plate 97 is made from an aluminum sheet by stamping. The cap plate 97 includes a supporting portion 971 and a safety film 972. The supporting portion 971 is substantially annular in shape. An outer diameter of the supporting portion 971 corresponds to the diameter of the mounting hole 913. The safety film 972 is dome-shaped and positioned in the center of the supporting portion 971. In the embodiment, the supporting portion 971 and the safety film 972 are integrally formed. The security film 971 defines two circular safety grooves 973. The safety grooves 973 are coaxial with each other and an outer safety groove 973 is formed between the supporting portion 971 and the safety film 972.

The leakproof film 98 is circular. The leakproof film 98 includes an annular fixing portion 981 and a balloon portion 982. The balloon portion 982 is substantially hemispherical. The fixing portion 981 extends radically outwardly from a periphery of an open end of the balloon portion 982. An outer diameter of the fixing portion 981 substantially corresponds to the diameter of the mounting hole 913. The leakproof film 98 is made of rubber with high temperature resistance, elasticity, and anti-aging properties.

The cap cover 99 is tubular and includes an annular pressing portion 991 and a cylindrical receiving portion 992. The pressing portion 991 extends radically outwardly from one end of the receiving portion 992.

When assembling the lithium ion secondary battery 2000, the first lower pad 951 is attached on lower surface 912 of the base plate 91 with each eight passing hole 511 of the first lower pad 951 being aligned with a corresponding first passing hole 915 of the base plate 91. The positive planar portion 9411 is attached on the first lower pad 951 and farther away the base plate 91. The positive bending portion 9412 extends away from the base plate 91. Each sixth passing hole 9413 is aligned with a corresponding eight passing hole 9511 of the first lower pad 951. The first upper pad 931 is attached on the upper surface 911 with each fourth passing hole 9311 being aligned with a corresponding first passing hole 915. The positive main portion 9211 is attached on the first upper pad 9311 with each second passing hole 9213 being align with a corresponding fourth passing hole 9311. Each first screw 9611 sequentially passing a corresponding sixth passing hole 9413, a corresponding eighth passing hole 9511, a corresponding first passing hole 915, a corresponding fourth passing hole 9311, and a corresponding second passing hole 9213. Each first ring 9612 sleeves over each first screw 9611 to isolate the first screw 9611 and the base plate 91. The base plate 91, the first lower pad 951, the positive conduction plate 941, the first upper pad 931, and the positive terminal 921 are riveted together by the first screws 9611. The first screws 9611 are electrically connected with the positive terminal 921.

The second lower pad 952 is attached on lower surface 912 of the base plate 91 with each ninth passing hole 9521 of the second lower pad 952 being aligned with a corresponding first passing hole 915 of the base plate 91. The negative planar portion 9421 is attached on the second lower pad 952 and farther away the base plate 91. The negative bending portion 9422 extends away from the base plate 91. Each seventh passing hole 9423 is aligned with a corresponding ninth passing hole 9521 of the first lower pad 952. The second upper pad 932 is attached on the upper surface 911 with each fifth passing hole 9321 being aligned with a corresponding first passing hole 915. The negative main portion 9221 is attached on the second upper pad 932 with each third passing hole 9223 being aligned with a corresponding fifth passing hole 9321. Each second screw 9611 sequentially passing a corresponding seventh passing hole 9423, a corresponding ninth passing hole 9521, a corresponding first passing hole 915, a corresponding fifth passing hole 9321, and a corresponding third passing hole 9223. Each second ring 9622 sleeves over each second screw 9621 to isolate the second screw 9621 and the base plate 91. The base plate 91, the second lower pad 952, the negative conduction plate 942, the second upper pad 932, and the negative terminal 922 are riveted together by the second screws 9621. The second screws 9621 are electrically connected with the negative terminal 922.

The base plate 91 is received and mounted in the opening of the can 90. The cap plate 97 is received in the mounting hole 913 with the supporting portion 971 contacting the bottom surface 9131 and the interior surface 9132. The supporting portion 971 is welded to the bottom surface 9131 and the interior surface 9132 by the ultrasonic welding process. The dome-shaped safety film 972 is convex away the can 90. The cap plate 97 encloses the can 90. The leakproof film 98 is received in the mounting hole 913 with fixing portion 981 pressing the supporting portion 971. The fixing portion 981 is welded to the supporting portion 971 and the interior surface 9132 by the ultrasonic welding process. The cap cover 99 is received in the mounting hole 913 with pressing portion 991 attaching on the fixing portion 981. The pressing portion 991 is welded to the interior surface 9132 of the mounting hole 913. The balloon portion 982 is accommodated in the receiving portion 992 of the cap cover 99.

In use, when an accident such as a short circuit or a collision occurs to the lithium ion secondary battery 2000, it results in the temperature of the electrolyte rapidly rising to about 100 to 200 centigrade degrees, the electrolyte is evaporated, and the internal pressure of the lithium ion secondary battery 2000 rising to a certain limitation. Because the safety film 972 is made from an aluminum sheet and is very soft, the safety film 972 will break down along the safety grooves 973. Therefore, an electrical circuitry formed by the lithium ion secondary battery 2000 is cut off. Because the leakproof film 98 is made of rubber with high temperature resistance, anti-aging, and elasticity properties. The leakproof film 98 won't break. The leakproof film 98 deforms to receive evaporated electrolyte in the balloon portion 982. Therefore, it can prevent the electrolyte leak out from the can 90. When the temperature of the electrolyte drops, the leakproof film 98 recovers to an initial state, and the evaporated electrolyte is liquefied and drops into the can 90 again.

In alternative embodiments, the cap assembly 200 also includes an enhancing plate. The enhancing plate is annular and defines a passage hole. An outer diameter of the enhancing plate corresponds to an outer diameter of the supporting portion 971. A diameter of the passage hole corresponds to a diameter of the safety film 972. The enhancing plate is clamped between the supporting portion 971 and the leakproof film 98. The enhancing plate enhances the supporting portion 971, therefore the safety film 972 is more readily break down along the safety grooves 973 when the internal pressure of the lithium ion battery 2000 rises.

In alternative embodiments, the leakproof film 20 is not limited to rubber but can be other material with high temperature resistance, elasticity, and anti-aging properties.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A cap assembly (100) for a lithium ion secondary battery (1000), comprising:
   a cap plate (30) comprising a supporting portion (31) and a safety film (32) positioned in the supporting portion (31), the safety film (32) defining safety grooves (33), the safety film (31) be capable of break down along the safety grooves (33);
   the cap plate (30) also including a cylindrical side wall (34) which is extends from an outer periphery of the supporting portion (31);
   a leak proof film (20) attached on the supporting portion (31), the leak proof film (20) being made of a material with high temperature resistance and elasticity properties;
   the leak proof film (20) being deformable to form an additional space for receiving evaporated electrolyte and pressurized gas when an accident occurs to the lithium ion secondary battery (1000);
   a cap cover (10) attached on the leak proof film (20); and
   the cap cover (10) being received in the side wall (34) with burrs of the cap cover (10) compactly contacting an inner surface of the side wall (34).

2. The cap assembly as claimed in claim 1, wherein the supporting portion (31) is annular, the safety film (32) is circular and defines two coaxial circular safety grooves (33), an outer safety groove (33) is formed between the supporting portion (31) and the safety film (32).

3. The cap assembly as claimed in claim 2, wherein the cap cover (10) is substantially circular and comprises a base portion (11), two inclination portions (12), and a top portion (13); the base portion (11) is an annular plate, each inclination portion (12) is in a strip shape and extends from an inner periphery of the base portion (11), each inclination portion (12) is slant to the base portion (11) and extends toward the other inclination portion (12); the top portion (13) is also in a strip shape and is connected between the inclination portions (12); the top portion (13) is parallel to the base portion (11); the cap cover (10) defines two cover through holes (14) symmetrically distributed at two sides of the top portion (13); a periphery of the side wall (34) is welded to the base portion (11).

4. The cap assembly as claimed in claim 2, wherein the cap assembly (100) comprises an outer gasket (40); the outer gasket 40 is made of poly ethylene-propylene and comprises a circular enclosure end (41) and a circular mounting end (42) opposite to the enclosure end (41), a diameter of the enclosure end (41) is greater than a diameter of the mounting end (42), the outer gasket (40) defines a stepped through hole (43) passing through the enclosure end (41) and the mounting end (42), the outer gasket (40) also includes an annular lug (44) extending radically inwardly from the enclosure end (41), the cap plate (30) is received in the outer gasket (40) with the supporting portion (31) being attached on the annular lug (44).

5. The cap assembly as claimed in claim 4, wherein the cap assembly (100) comprises an enhancing plate (70), the enhancing plate (70) is annular and is clamped between the cap plate (30) and the leak proof film (20), the enhancing plate (70) presses on the supporting portion (31) and surrounds the safety film (32).

6. The cap assembly as claimed in claim 1, wherein the leak proof film (20) is made of rubber and capable of form a balloon portion (21).

7. A cap assembly (200) for a lithium ion secondary battery (2000), comprising:
   a base plate (91) defining a mounting hole (913), the mounting hole (913) defining a bottom surface (9131) and a cylindrical interior surface (9132);
   a cap plate (97) comprising a supporting portion (971) and a safety film (972) positioned in the supporting portion (971), the safety film (972) defining safety grooves (973), the safety film (971) be capable of break down along the safety grooves (973);
   a leak proof film (98) comprising a fixing portion (981) and a balloon portion (982);
   a cap cover (99) comprising a pressing portion (991) and a receiving portion (992);
   the cap plate (97) being received in the mounting hole (913), the supporting portion (971) being welded to the bottom surface (9131) and the interior surface (9132) by an ultrasonic welding process;
   the fixing portion (981) resting on the supporting portion (971) and the interior surface (9132) by the ultrasonic welding process;
   the cap cover (99) attached on the leak proof film (98), the pressing portion (991) being welded to the interior surface (9132) of the mounting hole (913);
   the leak proof film (98) being made of a material with high temperature resistance and elasticity properties;
   the leak proof film (98) being deformable to form an additional space for receiving evaporated electrolyte and pressurized gas when an accident occurs to the lithium ion secondary battery (2000).

8. The cap assembly as claimed in claim 7, wherein the leak proof film (98) is made of rubber with high temperature resistance, elasticity, and anti-aging properties.

9. The cap assembly as claimed in claim 7, wherein the cap assembly (200) comprises a positive terminal (921), a first upper pad (931), a first lower pad (951), a positive conduction plate (941), and two first fasteners (961); the first upper pad (931) is attached to an upper surface (911) of the base plate (91), the first lower pad (951) is attached to an lower surface (912) of the base plate (91), the positive terminal (921) is attached to the first upper pad (931), the positive conduction plate (941) is attached to the first lower pad (951), and the positive terminal (921), the first upper pad (931), the first lower pad (951), and the positive conduction plate (941) are riveted together by the first fastener (961).

10. The cap assembly as claimed in claim 9, wherein the cap assembly (200) comprises a negative terminal (922), a second upper pad (932), a second lower pad (952), a negative conduction plate (942), and two second fasteners (962); the second upper pad (932) is attached to the upper surface (911), the second lower pad (952) is attached to the lower surface (912), the negative terminal (922) is attached to the second upper pad (932), the negative conduction plate (942) is attached to the second lower pad (952), and the negative terminal (922), the second upper pad (932), the second lower pad (952), and the negative conduction plate (942) are riveted together by the second fastener (962).

\* \* \* \* \*